(12) United States Patent
Kumar et al.

(10) Patent No.: US 10,781,658 B1
(45) Date of Patent: Sep. 22, 2020

(54) CONTROLLED DISINTEGRATION OF PASSAGE RESTRICTION

(71) Applicants: Deepak Kumar, Houston, TX (US); Anil Sadana, Houston, TX (US); Michael Johnson, Katy, TX (US)

(72) Inventors: Deepak Kumar, Houston, TX (US); Anil Sadana, Houston, TX (US); Michael Johnson, Katy, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 16/357,547

(22) Filed: Mar. 19, 2019

(51) Int. Cl.
*E21B 33/12* (2006.01)
*C09K 8/64* (2006.01)
*C09K 8/80* (2006.01)
*E21B 43/26* (2006.01)
*E21B 43/267* (2006.01)

(52) U.S. Cl.
CPC .............. *E21B 33/12* (2013.01); *C09K 8/64* (2013.01); *C09K 8/80* (2013.01); *E21B 43/261* (2013.01); *E21B 43/267* (2013.01); *C09K 2208/24* (2013.01); *C09K 2208/26* (2013.01)

(58) Field of Classification Search
None
See application file for complete search history.

(56) References Cited

U.S. PATENT DOCUMENTS

| 5,678,632 | A | 10/1997 | Moses et al. | |
| 2007/0181224 | A1* | 8/2007 | Marya | C09K 8/805 |
| | | | | 148/400 |
| 2008/0200354 | A1* | 8/2008 | Jones | C09K 8/528 |
| | | | | 507/244 |
| 2014/0060834 | A1* | 3/2014 | Quintero | E21B 33/13 |
| | | | | 166/292 |
| 2016/0097259 | A1 | 4/2016 | Tolman et al. | |
| 2016/0108713 | A1* | 4/2016 | Dunaeva | E21B 43/267 |
| | | | | 166/280.2 |
| 2016/0281454 | A1* | 9/2016 | Zhu | E21B 33/12 |
| 2017/0067328 | A1* | 3/2017 | Chauffe | E21B 34/14 |
| 2017/0198190 | A1* | 7/2017 | Maxey | C09K 8/467 |
| 2018/0128082 | A1 | 5/2018 | Hollan et al. | |
| 2018/0155598 | A1 | 6/2018 | Yadav et al. | |

FOREIGN PATENT DOCUMENTS

WO 2016108895 A1 7/2016
WO 2016145540 A1 9/2016

OTHER PUBLICATIONS

International Serach Report for International Application No. PCT/US2020/017721, International Filing Date Feb. 11, 2020, dated Jun. 16, 2020, 3 pages.
Written Opinion for International Application No. PCT/US2020/017721, International Filing Date Feb. 11, 2020, dated Jun. 16, 2020, 4 pages.

\* cited by examiner

*Primary Examiner* — Andrew Sue-Ako
(74) *Attorney, Agent, or Firm* — Cantor Colburn LLP

(57) ABSTRACT

A method for operating in a borehole comprises disposing in a downhole environment a system comprising a tubular having a passage and a first restriction positioned inside the tubular; engaging a restrictor with the first restriction to block the passage; injecting a treatment fluid into the tubular, the treatment fluid comprising an invert emulsion, a carboxylic acid ester, or a combination comprising at least one of the foregoing; and degrading and removing the first restriction.

21 Claims, 4 Drawing Sheets

CONTROLLED DISINTEGRATION OF PASSAGE RESTRICTION

BACKGROUND

Certain downhole operations involve placement of elements in a downhole environment, where the element performs its function, and is then removed. For example, ball/ball seat assemblies are often used to seal off lower zones in a borehole in order to carry out a hydraulic fracturing process (also referred to in the art as "fracking") to break up reservoir rock. After the fracking operation, the balls or plugs are then removed to allow fluid flow to or from the fractured rock. The removal of the ball seats, post-fracking, are also desirable since it opens up more cross-sectional area for easy hydrocarbon production, especially for the production where low pressure drops are advantageous such as heavy and viscous oil.

To facilitate removal, balls or plugs may be formed of a material that corrodes under downhole conditions, so that they need not be physically removed via external means or methods. However, in practice, ball seats are often made of non-corrodible materials because of the concern that the seats may corrode or disintegrate prematurely. Another challenge for using corrodible ball seats is that for multi-stage fracturing or stimulation operations, multiple ball seats are installed and disposed downhole at the same time, and it may be desirable to selectively remove the ball seat associated with a particular production zone while leaving the other ball seats intact. Accordingly, advances in removing ball seats will be well received by the industry.

SUMMARY

A method for operating in a borehole comprises disposing in a downhole environment a system comprising a tubular having a passage and a first restriction positioned inside the tubular; engaging a restrictor with the first restriction to block the passage; injecting a treatment fluid into the tubular, the treatment fluid comprising an invert emulsion, a carboxylic acid ester, or a combination comprising at least one of the foregoing; and degrading and removing the first restriction.

BRIEF DESCRIPTION OF THE DRAWINGS

The following descriptions should not be considered limiting in any way. With reference to the accompanying drawings, like elements are numbered alike.

DETAILED DESCRIPTION

The inventors have discovered that a treatment fluid can be pumped from the surface when the fluid is in an "inactive" state (means the fluid does not degrade the downhole articles), but become "active" once the treatment fluid is in contact with the downhole articles to be removed. The activated fluid degrades the articles to be removed resulting in their disintegration.

Figure 1:
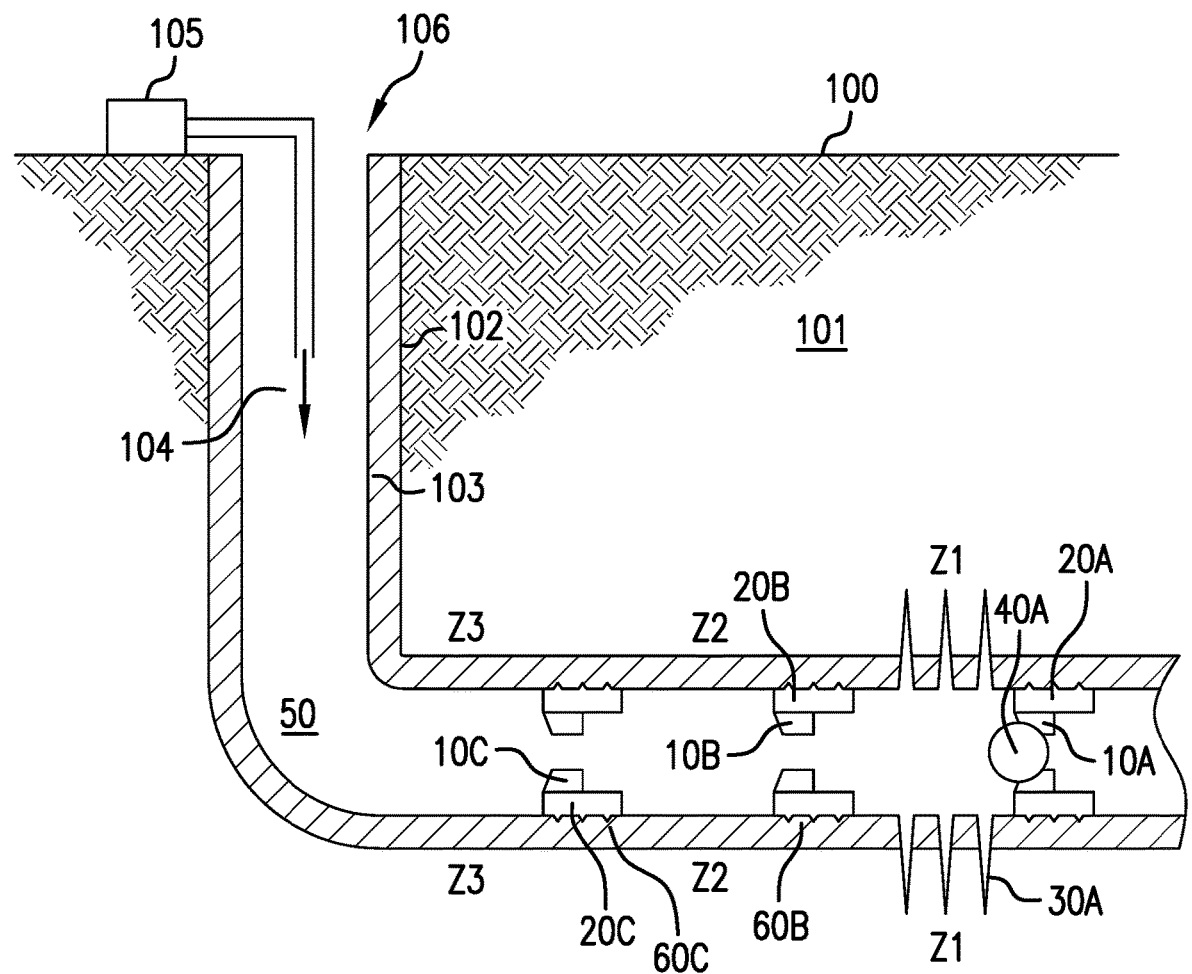
FIG. 1 is a simplified scheme illustrating a process of fracturing or stimulating a first production zone by disposing multiple ball seats in a borehole, engaging a first ball with a first ball seat, and performing a first fracturing or stimulating operation.
Figure 5:
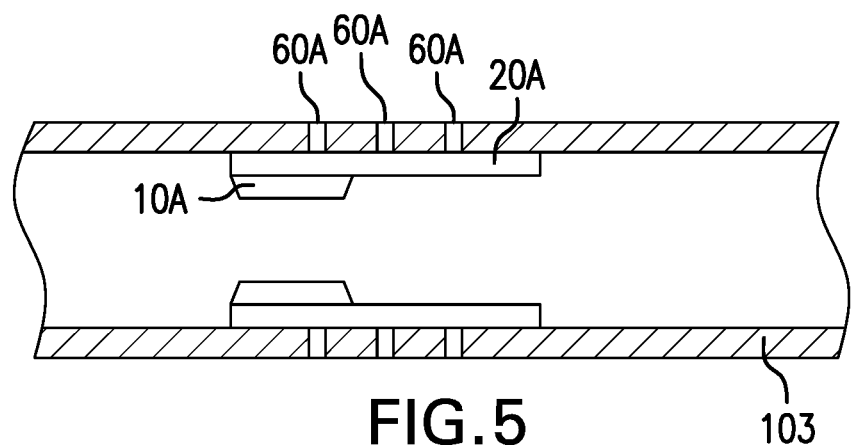
FIG. 5 is a cross-sectional view of a portion of the downhole system shown in FIG. 1 before the first ball is engaged with the first ball seat.
Figure 6:
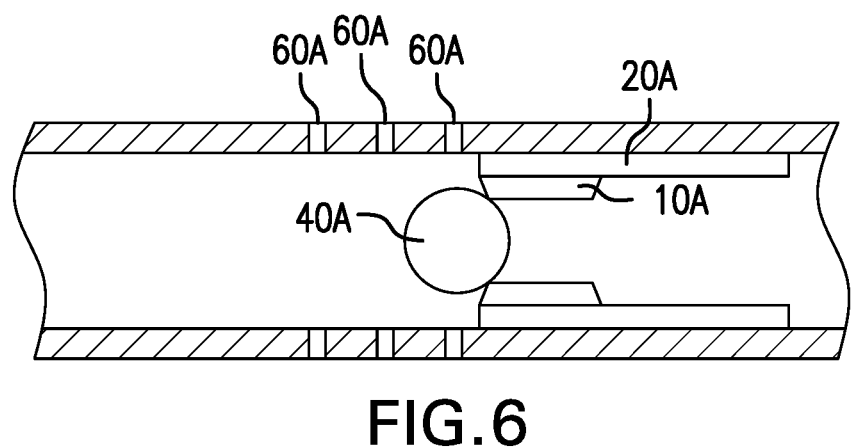
FIG. 6 is a cross-sectional view of a portion of the downhole system shown in FIG. 1 after the first ball is engaged with the first ball seat.

Referring to FIGS. 1, 5, and 6, a downhole system 106 is disposed in a borehole 102 formed in formation 101 to facilitate the production of oil and gas. The downhole system 106 can be disposed through multiple production zones such as Z1, Z2, and Z3. Borehole 102 may be a vertical well, a horizontal well, a deviated well, or any combination thereof.

The system 106 includes a tubular 103 having a passage 50 and a plurality of perforations 60A, 60B, 60C. The system also includes sleeves 20A, 20B, 20C and restrictions 10A, 10B, 10C disposed with the sleeves. The shape of the restrictions are not particularly limited as along as the restrictions can accommodate restrictors such as balls, darts, plugs, etc. for blocking fluid flow. In an embodiment, the restrictions have a generally cylindrical shape that tapers in a truncated, conical cross-sectional shape such as a ball seat, to allow, for example, a ball to seat and form a seal in the desired downhole location. In a further embodiment, the surface is milled to have a concave region having a radius designed to accommodate a ball or plug.

In use, the perforations are selectively openable by use of sleeves 20A, 20B, which are actuatable by restrictors 40A and 40B. For example, by landing restrictor 40A at restriction 10A disposed with sleeve 20A, the restrictor 40A blocks fluid flow through passage 50. Blockage of passage 50 enables a pressure differential to be formed across the restrictor 40A for urging the sleeve 20A from an initial or run-in position in which the perforations 60A are closed, as shown in FIG. 5, to an actuated position in which the perforations 60A are open, as shown in FIG. 6.

Fracturing or stimulating fluids 104 can then be pumped from a fluid source 105 to flow through the opened perforations 60A creating fractures 30A in production zone Z1.

Figure 2:
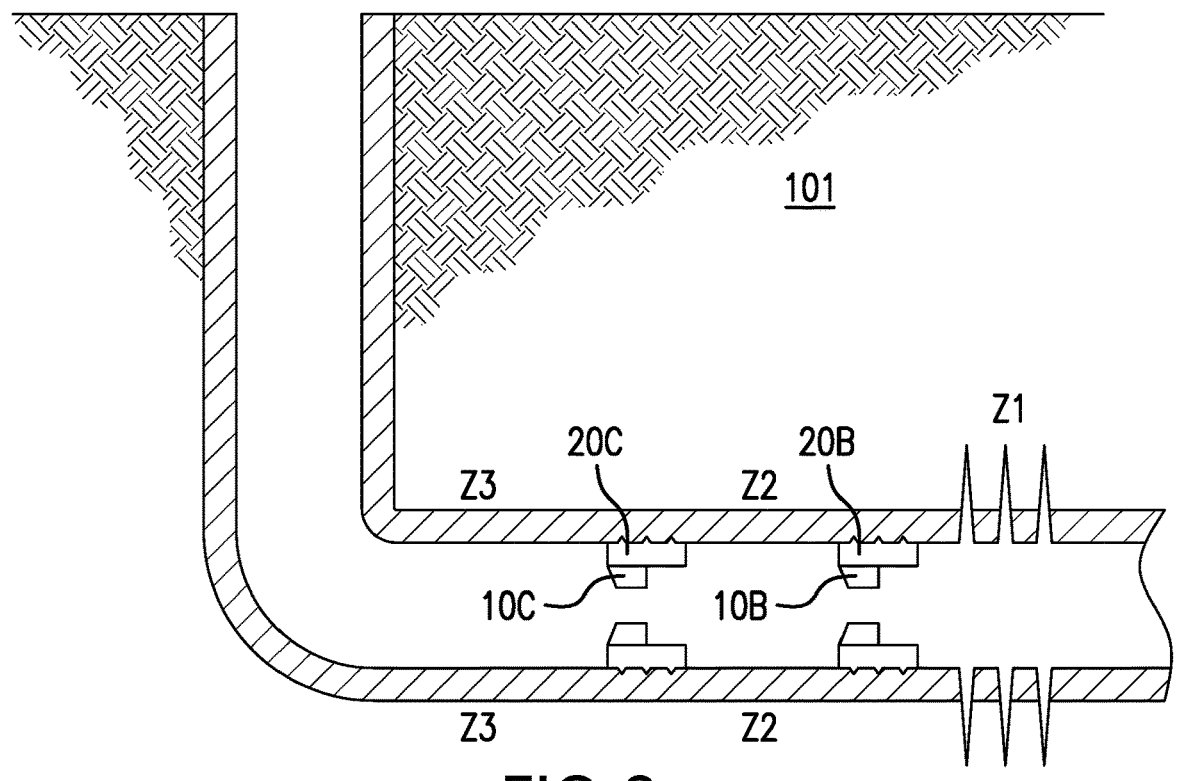
FIG. 2 is a simplified scheme illustrating that after the process shown in FIG. 1, the first ball seat is degraded and removed using a treatment fluid while other ball seats remain intact.

Referring to FIG. 2, after a desired operation such as fracturing or stimulating operation is performed in production zone Z1, the restriction 10A can be degraded and removed using a treatment fluid, which is inactive at the surface 100 but is activated when the treatment fluid contacts the restriction 10A.

Figure 3:
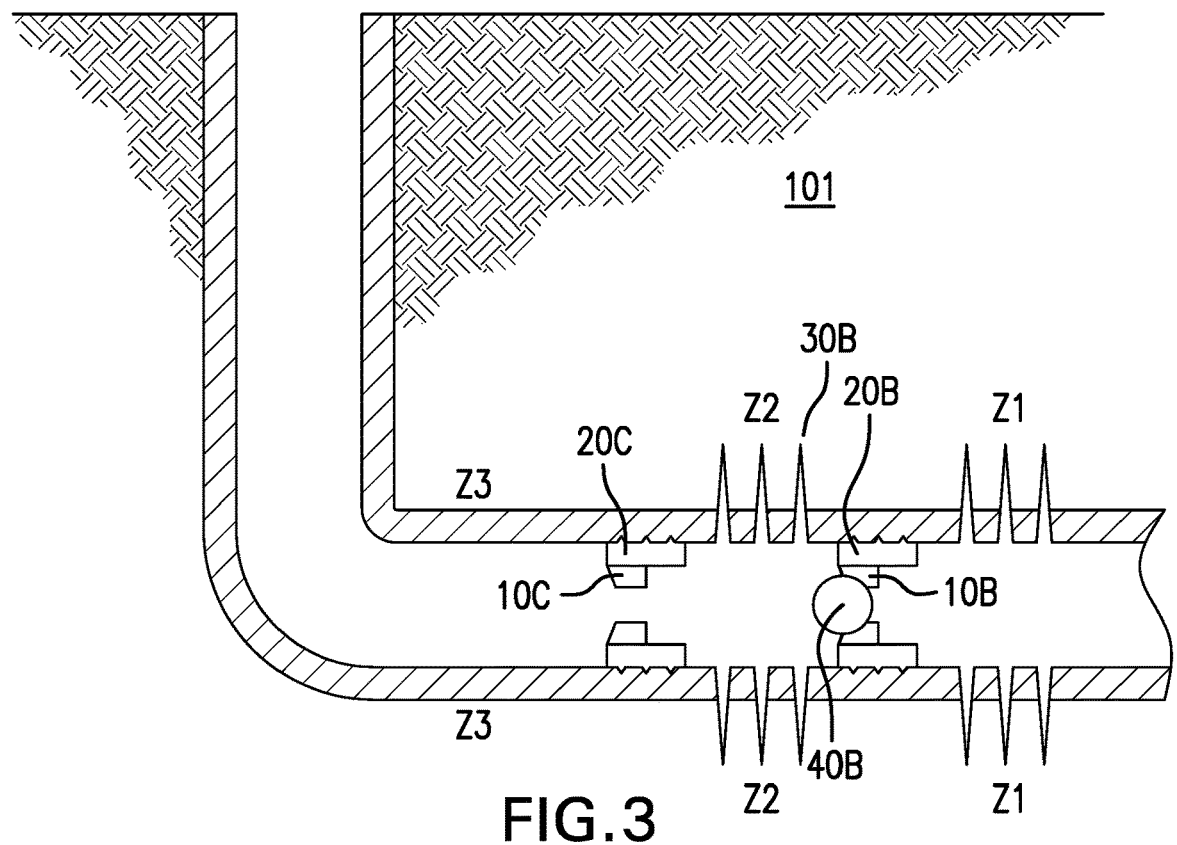
FIG. 3 is a simplified scheme illustrating that after the process shown in FIG. 2, a second ball is engaged with a second ball seat, and a second fracturing or stimulating operation is performed.
Figure 4:
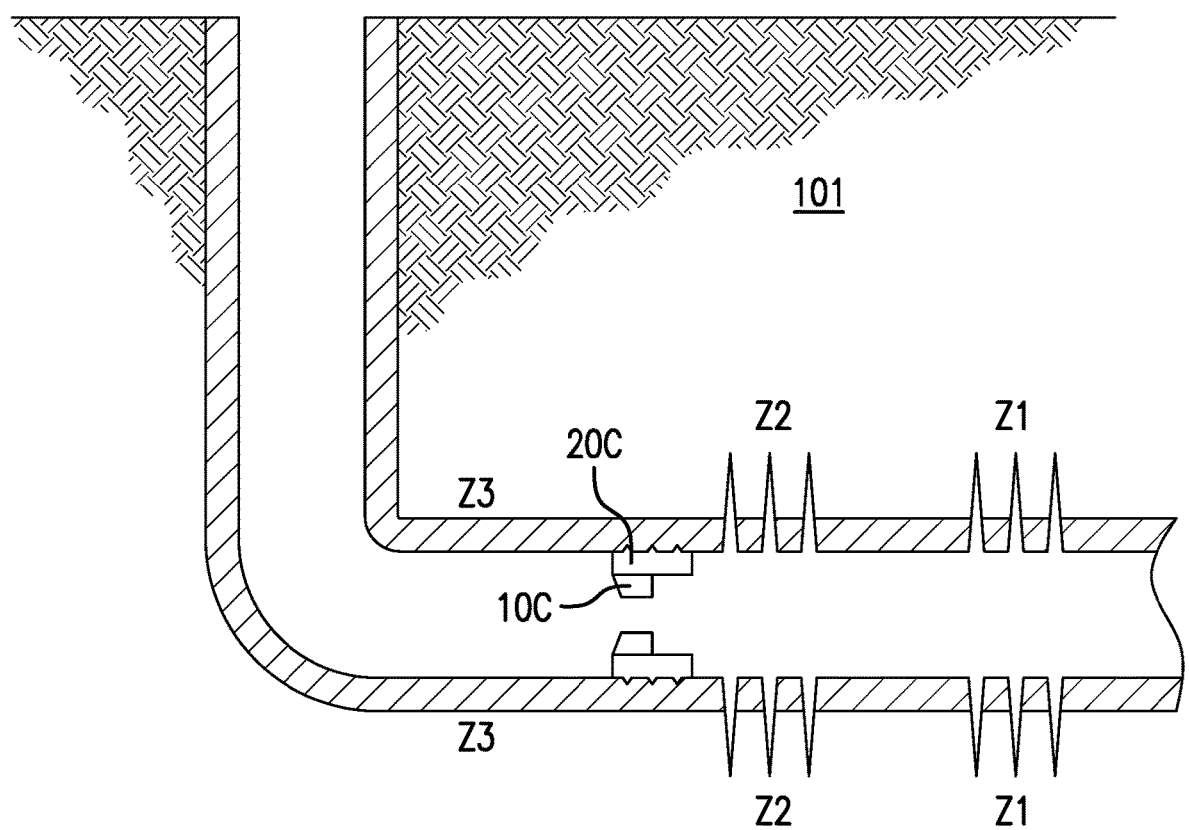
FIG. 4 illustrates that after the process shown in FIG. 3, the second ball seat is degraded and removed while leaving the other ball seats intact.

Next, referring to FIG. 3, another restrictor 40B is engaged with a second restriction 10B, and a second fracturing or stimulating operation is performed creating fractures 30B in another production zone Z2. Thereafter, the restriction 10B is degraded and removed using a treatment fluid disclosed herein while leaving restriction 10C intact. The process can be repeated until all the production zones of interest have been fractured or stimulated.

As used herein, the treatment fluid comprises an invert emulsion, a carboxylic acid ester, or a combination comprising at least one of the foregoing. It can be used at the tail end of a fracturing or stimulating operation with respect to a particular production zone. The treatment fluid can be a fracturing composition that further contains a proppant. Alternatively the treatment fluid can be free of proppants and is injected after a particular product zone has been fractured or stimulated.

Preferably the carboxylic acid esters are stable at temperatures lower than 150° F. At a temperature of greater than or equal to 150° F., the carboxylic acid esters decompose forming acids, which react with the degradable materials in the restrictions thus facilitating the removal of the restrictions. Examples of such acid esters include formic acid esters, acetic acid esters, lactic acid esters, tartaric acid esters, aspartic acid esters, citric acid esters, or a combination comprising at least one of the foregoing. The esters can include moieties of the formula—C(=O)—OR, wherein R is $C_{1-6}$ alkyl. The alkyl group can optionally have a substituent such as a halogen.

Optionally a catalyst is added to the treatment fluids to facilitate or control the rate of acid generation. The catalyst can be an enzymatic catalyst such as a lipase, an esterase, a protease, or a combination comprising at least one of the foregoing. Other enzymatic catalysts disclosed in U.S. Pat. No. 5,678,632 can also be used. The catalyst can be used in free form or immobilized on a support. The catalyst may be in a controlled release form, for example in encapsulated form, to further delay the decomposition of the acid esters and therefore the generation of acid.

As used herein, an invert emulsion is a complex heterogeneous fluid. Invert emulsions could be described as a polar fluid emulsified as the discontinuous or internal phase with a non-polar fluid as the continuous or external phase.

The internal phase of the invert emulsions contain water and a disintegration agent that can facilitate the degradation of the degradable materials in the restrictions once released from the invert emulsions. The disintegration agent comprises potassium chloride (KCl), an acid such as hydrochloric acid (HCl), calcium chloride ($CaCl_2$), calcium bromide ($CaBr_2$) or zinc bromide ($ZnBr_2$), or a combination comprising at least one of the foregoing.

The continuous or external phase in the invert emulsions is an oil phase, and may comprise any oil including, but not limited to, a diesel oil; a paraffin oil; a vegetable oil; a soybean oil; a mineral oil; a crude oil; a gas oil; kerosene, an aliphatic solvent, an aromatic solvent; a synthetic oil; or a combination comprising at least one of the foregoing.

The emulsifiers used are the same ones typically used in water-in-oil emulsions. These include various fatty acid and derivatives thereof, clay, polymers such as polyamides, or a combination comprising at least one of the foregoing. Exemplary fatty acid derivatives include fatty acid soaps, such as the calcium soaps, which can be prepared by reacting a fatty acid with lime.

The suitable amount of the internal phases in the invert emulsions can be adjusted based on the specific disintegrable materials used in the restrictions. In an embodiment, the internal phase is present in an amount of about 5 vol. % to about 90 vol. %, preferably about 15 vol. % to about 80 vol. %, more preferably about 30 vol. % to about 70 vol. %, based on the total volume of the invert emulsions.

Advantageously, the restrictions used in multi-stage fracturing or stimulating operations can be selectively removed by the treatment fluid disclosed herein. In particular, the treatment fluid can be pumped from the surface when the fluid is in an "inactive" state, but only become "active" once the treatment fluid is in contact with the target restriction to be removed. Referring to FIG. 1, when the treatment fluid passes restrictions 10C and 10B, the treatment fluid is not activated, thus the treatment fluid does not degrade restrictions 10C and 10B. When the treatment fluid reaches the restriction 10A to be removed, the fluid is activated thus restriction 10A is selectively removed leaving restrictions 10B and 10C intact.

When the treatment fluid contains the carboxylic acid esters, activating the treatment fluid means converting the carboxylic acid esters to acids. The conversion can be achieved by allowing the treatment fluid to be heated to a temperature of greater than or equal to 150° F. The heat source includes the formation itself. Allowing the treatment fluid to be heated to a certain temperature means that the treatment fluid is allowed to stay in the downhole environment (as opposed to just passing by) for an extended period of time.

When the treatment fluid contains the invert emulsion, activating the treatment fluid means breaking the invert emulsion to release the disintegration agent. In an embodiment, the invert emulsion is broken in response to a change in temperature allowing the discontinuous internal phase to coalesce.

The restrictions can contain a degradable material, which includes a metal, a metal alloy, a metal composite, a polymer, or a combination comprising at least one of the foregoing. Exemplary degradable metals and alloys include zinc metal, magnesium metal, aluminum metal, manganese metal, an alloy thereof, or a combination comprising at least one of the foregoing. In addition to zinc, magnesium, aluminum, manganese, or alloys thereof, the degradable material can further comprise a cathodic agent such as Ni, W, Mo, Cu, Fe, Cr, Co, an alloy thereof, or a combination comprising at least one of the foregoing to adjust the degradation rate of the degradable material. In an embodiment, the degradable material is a corrodible material (anode) and the cathodic agent are constructed on the microstructural level to form μm-scale galvanic cells (microgalvanic cells) when the material are exposed to an electrolytic fluid such as downhole brines. The cathodic agent has a standard reduction potential higher than −0.6 V. The net cell potential between the corrodible material and cathodic agent is above 0.5 V, specifically above 1.0 V.

As used herein, a metal composite refers to a composite having a substantially-continuous, cellular nanomatrix comprising a nanomatrix material; a plurality of dispersed particles comprising a particle core material that comprises Mg, Al, Zn or Mn, or a combination thereof, dispersed in the cellular nanomatrix; and a solid-state bond layer extending throughout the cellular nanomatrix between the dispersed particles. The matrix comprises deformed powder particles formed by compacting powder particles comprising a particle core and at least one coating layer, the coating layers joined by solid-state bonding to form the substantially-continuous, cellular nanomatrix and leave the particle cores as the dispersed particles. The dispersed particles have an average particle size of about 5 μm to about 300 μm. The nanomatrix material comprises Al, Zn, Mn, Mg, Mo, W, Cu, Fe, Si, Ca, Co, Ta, Re or Ni, or an oxide, carbide or nitride thereof, or a combination of any of the aforementioned materials. The chemical composition of the nanomatrix material is different than the chemical composition of the particle core material. The composites have been described in U.S. Pat. Nos. 8,528,633 and 9,101,978.

Optionally the restrictions include a body formed of the degradable material and a surface coating disposed on a surface of the body. The coating is resistant to corrosion by a corrosive material. As used herein, "resistant" means the coating is not etched or corroded by any corrosive downhole conditions encountered (i.e., brine, hydrogen sulfide, etc., at pressures greater than atmospheric pressure, and at temperatures in excess of 50° C.) such that any portion of the body is exposed, for a period of greater than or equal to one week, specifically for a period of greater than or equal to one month.

In an embodiment, the coating contains a carbide such as tungsten carbide and a titanium carbide; a metal such as tungsten, titanium, cobalt, chromium, iron, nickel, a rare earth metal such as Nb, an alloy thereof, or a combination comprising at least one of the foregoing. Specific examples of the coating materials include WC—Co alloys, WO—Co—Cr alloys, Fe—Cr—Mn—Si—B alloys, Fe—Cr—Ni—WC—TiC—B alloys, and Fe—Cr—Mo—W—Nb—Mn—B—C alloys.

The coating can include a single layer, or multiple layers of the same or different metals/alloys. The coating can have a thickness of less than or equal to about 1,000 micrometers (i.e., about 1 millimeter). In an embodiment, the metallic layer may have a thickness of about 100 to about 1,000 micrometers, specifically about 250 to about 750 micrometers and still more specifically about 400 to about 600 micrometers. The coating can be applied to the degradable body of the restrictions by any suitable method, including an electroless plating process, an electrodeposition, a wire arc process, and a high velocity oxygen fuel (HVOF) process.

During removing, proppants in fracturing compositions flow past the restrictions and erodes the coating to expose the degradable body to the treatment fluid.

Further included in this disclosure are the following specific embodiments, which do not necessarily limit the claims.

Embodiment 1

A method for operating in a borehole, the method comprising: disposing in a downhole environment a system comprising a tubular having a passage and a first restriction positioned inside the tubular; engaging a restrictor with the first restriction to block the passage; injecting a treatment fluid into the tubular, the treatment fluid comprising an invert emulsion, a carboxylic acid ester, or a combination comprising at least one of the foregoing; and degrading and removing the first restriction.

Embodiment 2

The method as in any prior embodiment, wherein the treatment fluid comprises a polar fluid emulsified as a discontinuous internal phase with a non-polar fluid as a continuous phase.

Embodiment 3

The method as in any prior embodiment, wherein the discontinuous internal phase comprises a disintegration agent; and the continuous phase comprises an oil.

Embodiment 4

The method as in any prior embodiment, wherein the disintegration agent comprises an acid, potassium chloride, calcium chloride, calcium bromide, zinc bromide, or a combination comprising at least one of the foregoing.

Embodiment 5

The method as in any prior embodiment, further comprising breaking the invert emulsion when the treatment fluid is in contact with the restriction.

Embodiment 6

The method as in any prior embodiment, wherein breaking the invert emulsion comprises heating the treatment fluid to a temperature of greater than 150° F.

Embodiment 7

The method as in any prior embodiment, further comprising releasing the disintegration agent from the internal phase; and contacting the released disintegration agent with the first restriction.

Embodiment 8

The method as in any prior embodiment, wherein the treatment fluid comprises the carboxylic acid ester, which comprises a formic acid ester, an acetic acid ester, a lactic acid ester, a tartaric acid ester, a citric acid ester, or a combination comprising at least one of the foregoing.

Embodiment 9

The method as in any prior embodiment, wherein the treatment fluid is a fracturing composition that further comprises a proppant.

Embodiment 10

The method as in any prior embodiment, further comprising allowing the carboxylic acid ester to decompose forming an acid when the treatment fluid contacts the first restriction.

Embodiment 11

The method as in any prior embodiment, wherein the carboxylic acid aster is decomposed in the presence of a catalyst added to the treatment fluid.

Embodiment 12

The method as in any prior embodiment, wherein the catalyst is an enzymatic catalyst.

Embodiment 13

The method as in any prior embodiment, further comprising performing a downhole operation after engaging the restrictor with the first restriction.

Embodiment 14

The method as in any prior embodiment, wherein the downhole operation is a fracturing operation or a stimulation operation.

Embodiment 15

The method as in any prior embodiment, wherein the first restriction has a degradable body and a coating disposed on a surface of the degradable body.

Embodiment 16

The method as in any prior embodiment, further comprising eroding the coating.

Embodiment 17

The method as in any prior embodiment, wherein the eroding comprises flowing a slurry of a proppant over the coating.

Embodiment 18

The method as in any prior embodiment, wherein the first restriction is a ball seat.

Embodiment 19

The method as in any prior embodiment, wherein the system comprises a second restriction positioned inside the tubular, and the method further comprises: engaging a second restrictor with the second restriction after the first restriction is degraded and removed; injecting a second treatment fluid into the tubular, the second treatment fluid comprising a second invert emulsion, a second carboxylic acid ester, or a combination comprising at least one of the foregoing; and degrading and removing the second restriction.

Embodiment 20

The method as in any prior embodiment further comprising performing a second downhole operation after engaging the second restrictor with the second restriction.

All ranges disclosed herein are inclusive of the endpoints, and the endpoints are independently combinable with each other. As used herein, "combination" is inclusive of blends, mixtures, alloys, reaction products, and the like. The size of the particles refers to the largest dimension of the particles and can be determined by high resolution electron or atomic force microscope technology. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A method for operating in a borehole, the method comprising:
    disposing in a downhole environment a system comprising a tubular having a passage and a first and a second restriction positioned inside the tubular, wherein the first and second restrictions each independently comprises a degradable body without a surface coating, the degradable body comprising a degradable material, which contains a metal, a metal alloy, a metal composite, a polymer, or a combination comprising at least one of the foregoing;
    engaging a restrictor with the first restriction to block the passage;
    injecting a treatment fluid into the tubular, the treatment fluid comprising an invert emulsion, which comprises a polar fluid emulsified as a discontinuous internal phase with a non-polar fluid as a continuous phase, the discontinuous internal phase comprises a disintegration agent;
    degrading and removing the first restriction with the treatment fluid,
    engaging a second restrictor with the second restriction after the first restriction is degraded and removed;
    injecting a second treatment fluid into the tubular, the second treatment fluid comprising a second invert emulsion, a second carboxylic acid ester, or a combination comprising at least one of the foregoing; and
    degrading and removing the second restriction with the second treatment fluid,
    wherein the method further comprises breaking the invert emulsion to release the disintegration agent in response to a change in temperature; and allowing the discontinuous internal phase to coalesce.

2. The method of claim 1, wherein the disintegration agent comprises an acid, potassium chloride, calcium chloride, calcium bromide, zinc bromide, or a combination comprising at least one of the foregoing.

3. The method of claim 1, wherein the treatment fluid is a fracturing composition that further comprises a proppant.

4. The method of claim 1, further comprising performing a downhole operation after engaging the restrictor with the first restriction.

5. The method of claim 4, wherein the downhole operation is a fracturing operation or a stimulation operation.

6. The method of claim 1, wherein the first restriction is a ball seat.

7. The method of claim 1 further comprising performing a second downhole operation after engaging the second restrictor with the second restriction.

8. The method of claim 1, wherein the discontinuous internal phase is present in an amount of about 30 vol. % to about 70 vol. % based on the total volume of the invert emulsion.

9. A method for operating in a borehole, the method comprising:
    disposing in a downhole environment a system comprising a tubular having a passage and a first and a second restriction positioned inside the tubular, wherein the first and second restrictions each independently comprises a degradable body without a surface coating, the degradable body comprising a degradable material, which contains a metal, a metal alloy, a metal composite, a polymer, or a combination comprising at least one of the foregoing;
    engaging a restrictor with the first restriction to block the passage;
    injecting a treatment fluid into the tubular, the treatment fluid comprising an invert emulsion, a carboxylic acid ester, or a combination comprising at least one of the foregoing;
    degrading and removing the first restriction with the treatment fluid,
    engaging a second restrictor with the second restriction after the first restriction is degraded and removed;
    injecting a second treatment fluid into the tubular, the second treatment fluid comprising a second invert emulsion, or a combination comprising the second invert emulsion and a second carboxylic acid ester, the second invert emulsion comprising a polar fluid emulsified as a discontinuous internal phase with a non-polar fluid as a continuous phase, the discontinuous internal phase comprising a disintegration agent;

breaking the second invert emulsion to release the disintegration agent in response to a change in temperature; and degrading and removing the second restriction with the second treatment fluid.

10. The method of claim 9, wherein the treatment fluid comprises an invert emulsion comprising a polar fluid emulsified as a discontinuous internal phase with a non-polar fluid as a continuous phase.

11. The method of claim 10, wherein the discontinuous internal phase comprises a disintegration agent; and the continuous phase comprises an oil.

12. The method of claim 11, further comprising releasing the disintegration agent from the internal phase; and contacting the released disintegration agent with the first restriction.

13. The method of claim 10, further comprising breaking the invert emulsion when the treatment fluid is in contact with the restriction.

14. The method of claim 13, wherein breaking the invert emulsion comprises heating the treatment fluid to a temperature of greater than 150° F.

15. The method of claim 9, wherein the treatment fluid comprises the combination of the invert emulsion and the carboxylic acid ester, and the carboxylic acid ester comprises a formic acid ester, an acetic acid ester, a lactic acid ester, a tartaric acid ester, a citric acid ester, or a combination comprising at least one of the foregoing.

16. The method of claim 15, further comprising allowing the carboxylic acid ester to decompose forming an acid when the treatment fluid contacts the first restriction.

17. The method of claim 16, wherein the carboxylic acid ester is decomposed in the presence of a catalyst added to the treatment fluid.

18. The method of claim 17, wherein the catalyst is an enzymatic catalyst.

19. A method for operating in a wellbore, the method comprising:

disposing in a downhole environment a system comprising a tubular having a passage and a first and a second restriction positioned inside the tubular;

engaging a restrictor with the first restriction to block the passage;

injecting a treatment fluid into the tubular, the treatment fluid comprising an invert emulsion, or a combination comprising the invert emulsion and a carboxylic acid ester, the invert emulsion comprising a polar fluid emulsified as a discontinuous internal phase with a non-polar fluid as a continuous phase, the discontinuous internal phase comprising a disintegration agent;

breaking the invert emulsion to release the disintegration agent in response to a change in temperature;

degrading and removing the first restriction with the treatment fluid, engaging a second restrictor with the second restriction after the first restriction is degraded and removed;

injecting a second treatment fluid into the tubular, the second treatment fluid comprising a second invert emulsion, a second carboxylic acid ester, or a combination comprising at least one of the foregoing; and degrading and removing the second restriction with the second treatment fluid wherein the first and the second restrictions each independently has a degradable body and a coating disposed on a surface of the degradable body, the degradable body comprising a degradable material, which contains a metal, a metal alloy, a metal composite, a polymer, or a combination comprising at least one of the foregoing, and the coating has a thickness of about 400 microns to about 600 microns.

20. The method of claim 19, further comprising eroding the coating.

21. The method of claim 20, wherein the eroding comprises flowing a slurry of a proppant over the coating.

* * * * *